United States Patent [19]
Tsuchiya et al.

[11] 4,269,373
[45] May 26, 1981

[54] AUTOMATIC STOP MECHANISM FOR TAPE RECORDER

[75] Inventors: Tatsuhiko Tsuchiya; Mikiwo Oka, both of Kakuda, Japan

[73] Assignee: Alps Electric Co., Ltd., Tokyo, Japan

[21] Appl. No.: 76,603

[22] Filed: Sep. 18, 1979

[30] Foreign Application Priority Data

Sep. 29, 1978 [JP] Japan ............... 53/133669[U]

[51] Int. Cl.³ .................. B65H 59/38; G03B 1/02; G11B 15/13
[52] U.S. Cl. .......................................... 242/191
[58] Field of Search ............... 242/189–191, 242/186; 360/71, 74, 137

[56] References Cited

U.S. PATENT DOCUMENTS

| 3,653,607 | 4/1972 | Lambeek et al. | 242/191 |
| 3,915,408 | 10/1975 | Ishikawa | 242/191 |
| 3,955,776 | 5/1976 | Komatsu et al. | 242/191 |
| 4,123,015 | 10/1978 | Komatsu et al. | 242/191 |
| 4,177,489 | 12/1979 | Hasegawa | 360/74.2 |
| 4,190,215 | 2/1980 | Hochbaum et al. | 242/186 |
| 4,194,704 | 3/1980 | Osanai | 242/191 |

Primary Examiner—Leonard D. Christian
Attorney, Agent, or Firm—Guy W. Shoup; Gerard F. Dunne

[57] ABSTRACT

An automatic stop mechanism for a tape recorder having a first rotary member adapted to rotate in connection with the feed of the tape, a second rotary member adapted to rotate in connection with the operation of a motor, and a slide member adapted to be displaced in accordance with the state of operation of said first and second rotary members. The slide member is adapted to switch the tape recorder to inoperative mode when the first rotary member stops to rotate.

15 Claims, 10 Drawing Figures

AUTOMATIC STOP MECHANISM FOR TAPE RECORDER

BACKGROUND OF THE INVENTION

The present invention relates to an automatic stop mechanism for a tape recorder.

Cassette tape recorders typically have automatic stop mechanisms adapted to reset automatically a recording push button or a play-back push button in order to stop the tape recorder automatically when the tape has run to its end during recording or play-back operation of the recorder.

Such mechanisms typically have detecting levers sensitive to a change in the tension of the tape and located at a position near where the tape leaves the reel in the cassette and runs straight or linearly, such that the path of the tape may be wound or curved around the detecting rod. When the tape is run to its end, the tension in the tape increases and tends to straighten the tape and thereby generate a force to displace the detecting rod. The automatic stopping of the recording operation or the play-back operation is effected by making use of this movement of the detecting rod.

Such conventional automatic stopping mechanisms, however, have an impractically complicated construction which oftens includes several minute or delicate gears and levers, resulting in difficulty in the production and a raised cost of manufacture.

SUMMARY OF THE INVENTION

It is, therefore, an object of the present invention to provide a simply constructed automatic stop mechanism for a tape recorder.

It is another object of the present invention to provide such an automatic stop mechanism which is also free from erroneous operation.

It is still another object of the present invention to provide an automatic stop mechanism which can operate also during a fast forward operation and a rewinding of the tape, as well as in the play-back and recording operation.

DESCRIPTION OF THE PREFERRED EMBODIMENTS

Figure 1:
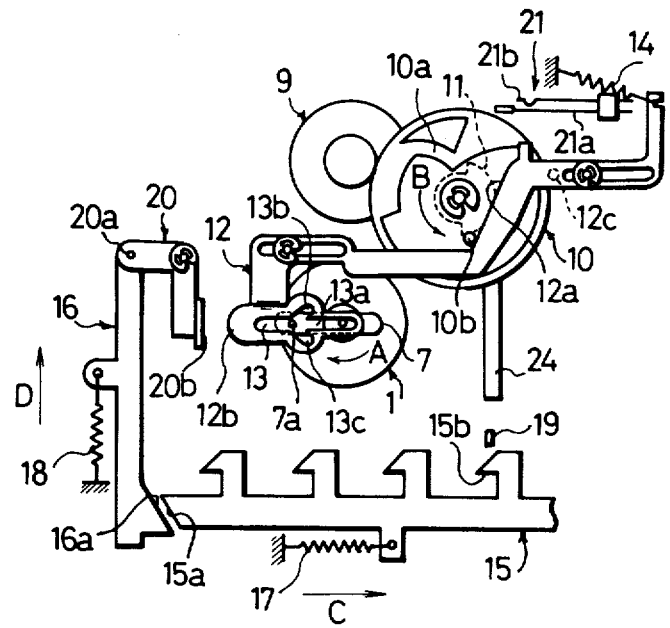
FIG. 1 is a plan view of an automatic stop mechanism of the present invention in a stopping mode.

Hereinafter, a preferred embodiment of the present invention will be described with specific reference to FIGS. 1 to 7. A reference numeral 1 denotes a first rotary member such as a reel drive wheel adapted to rotate in connection with the feed of the tape. The rotary member 1 is attached to a rotary shaft 2 as shown particularly in FIG. 5. The rotary shaft 2 is rotatably carried by a bearing 4 which is mounted on a chassis 3, and is provided at its one end with a reel holder 5 adapted to engage a reel on which the tape is wound. An oscillation plate 7 is loosely fitted to the other end of the rotary shaft 2 and is pressed slightly against the base 1a of the reel drive wheel 1 by means of a compression spring 6. The oscillation plate 7 makes frictional engagement with the base 1a and is allowed to slip on the latter. The oscillation plate 7 has a pin 7a which is adapted to engage a cam port 13 provided in a later-mentioned slide plate 12.

Figure 5:
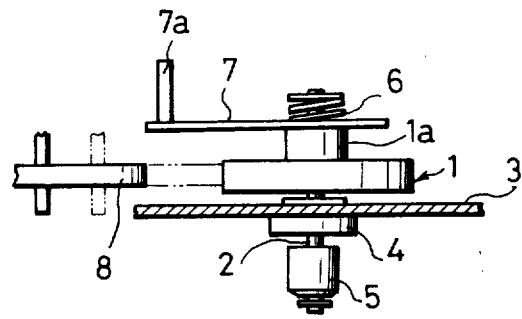
FIG. 5 is a side elevational view showing a first rotary member of the automatic stop mechanism of the present invention.

Referring to FIG. 5, a reference numeral 8 denotes a pulley for rotating the reel drive wheel 1. This pulley 8 is movable to a position where it engages the reel drive wheel 1, as shown by broken line. Referring to FIG. 1, a reference numeral 9 denotes a drive pulley which is rotatable independently of the feed of the tape, in accordance with the rotation of the motor shaft which is not shown. A reference numeral 10 designates a second rotary member which is also adapted to rotate independently of the tape feed upon engagement with the drive pulley 9.

As particularly shown in FIGS. 4A and 4B, the second rotary member 10 is provided on its obverse side (See FIG. 4A) with a cam groove 10a having the particular shape shown and a drive pin 10b which is adapted to selectively engage the slide plate 12. Also, a generally circular cam 11 having a large-diameter portion 11a and a small-diameter portion 11b is formed on the reverse side of the second rotary member 10 (See FIG. 4B). Referring again to FIG. 1, the slide plate 12 has a substantially stepped-shape and is slidably attached to the chassis 3, and is provided with an inclined portion 12a engageable with the drive pin 10b of the second rotary member 10, engaging pin 12c adapted to engage the cam groove 10a, a cam port 13 engaging the pin 7a of the oscillation plate 7 loosely fitted to the first rotary member 1, and with a driving part 12b.

The cam port 13 is constituted by a central-slot 13a and retaining slots 13b and 13c which are separated from each other by the slot 13a. A reference numeral 14 denotes a spring for biasing the slide plate 12 always in the direction opposite to the direction shown by an arrow C in FIG. 1.

A retainer plate 15 is adapted to hold operation rods (not shown) for selecting recording, play-back, fast forward and rewinding operations at their respective operating positions. The retainer plate 15 is provided at its one end with a tapered cam surface 15a engageable with a tapered cam surface 16a provided on a releasing lever 16. A reference numeral 17 denotes a spring adapted to bias the retainer plate in the direction opposite to the direction of the arrow C, while a reference numeral 18 denotes a spring which is adapted to bias the releasing lever 16 in the direction opposite to the direction of an arrow D.

A play-back operation rod (not shown) has a retaining tab 19 engageable with a retaining portion 15b of the retainer plate 15.

A reference numeral 20 denotes a rotary lever rotatably secured to the chassis 3 and connected at its one end 20a to a releasing lever 16 and opposes at its other end 20b the driving part 12b of the slide plate 12. A reference numeral 21 denotes a switch for stopping the motor. The switch 21 is constituted by a first leaf 21a and a second leaf 21b.

Figure 6:
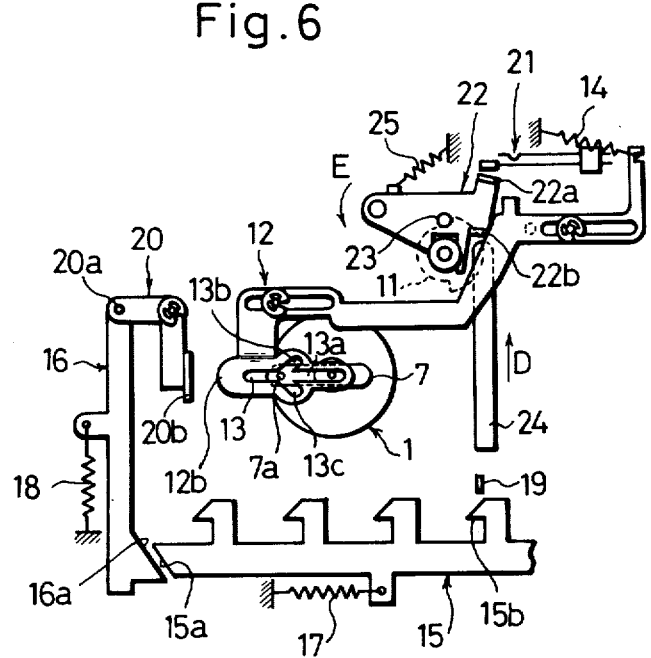
FIG. 6 is a plan view explanatory of the structures for preventing the erroneous operation of the automatic stop mechanism of the present invention.
Figure 7:
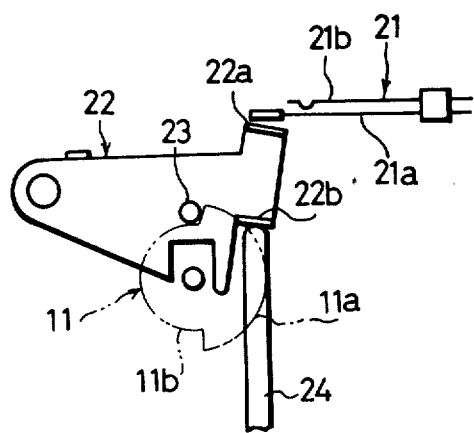
FIGS. 7A, 7B and 7C are plan views of essential parts of the automatic stop mechanism of the present invention, showing operation of a member for preventing the erroneous operation of the automatic stop mechanism.
Figure 7:
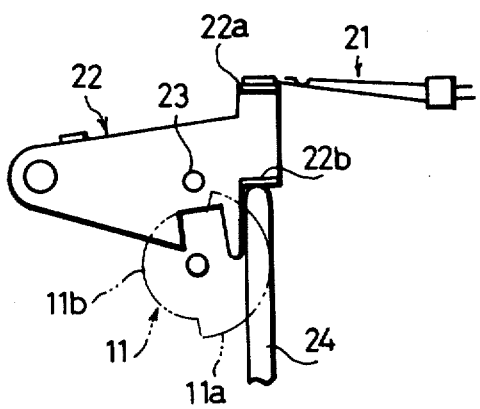
Figure 7:
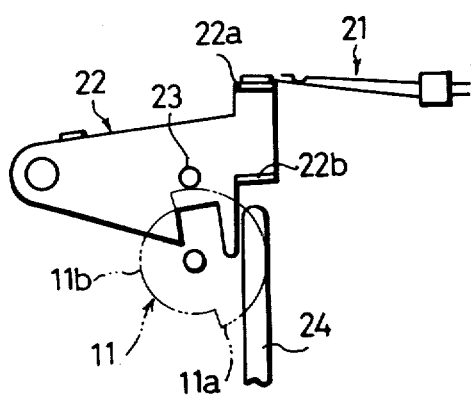

As shown particularly in FIGS. 6 and 7, the switch 21 is adapted to be operated by means of an operation member 22 which is rotatably mounted on the chassis 3. The operation member 22 carries an engaging pin 23 adapted for engagement with the circular cam 11 provided on the second rotary member 10. Reference numerals 22a and 22b denote a bent tab engageable with the switch 21 and a bent tab engageable with the operation lever 24 respectively.

The operation member 22 is slightly biased in the clockwise direction by means of a coiled spring 25. The operation member 22 is adapted to be rotated by the operation lever 24 which is moved in accordance with the manual operation of operation rods for play-back, rewinding and fast forwarding.

Hereinafter, a description will be made as to how the automatic stop mechanism of the present invention operates during play-back operation, with specific reference to FIGS. 1 to 3. FIG. 1 shows the automatic stop mechanism in the inoperative state of the tape recorder. As the operation rod for play-back is operated in this state, the retaining tab 19 of the operation rod comes to be retained by the retaining portion 15b of the retainer plate 15. The operation rod actuates various parts necessary for the play-back operation of the tape recorder. The operation rod presses the operation lever 24 upwardly which in turn rotates the operation member 22 to close the switch 21 thereby to start the driving motor. As a result of the start of the driving motor, the first rotary member is rotated in the direction of an arrow A shown in FIG. 1, while the second rotary member 10 is rotated in the direction of the arrow B. As a result of the rotation of the second rotary member 10, the slide plate 12 in the state shown in FIG. 1 is pressed at its inclined portion 12a by the drive pin 10b of the second rotary member 10 and is thus moved in the direction of the arrow C. Then, as the inclined portion 12b is released by the drive pin 10b, the slide plate 12 is moved in the direction opposite to the direction of arrow C by the force of a spring 14.

Meanwhile, the oscillation plate 7 tends to rotate in the same direction as the first rotary member 1 as a result of the rotation of the latter. However, the rotation of the oscillation plate 7 is limited by the mutual engagement of the cam port 13 of the slide plate 12 and the 7a of the oscillation plate 7, so that the oscillation plate 7 slips against the driving force of the first rotary member after the oscillation plate has been rotated to a predetermined angular position.

As the slide plate 12 moves first in the direction of arrow C and then in the opposite direction, the retaining slot 13b of the cam port 13 comes to engage the pin 7a.

Figure 2:
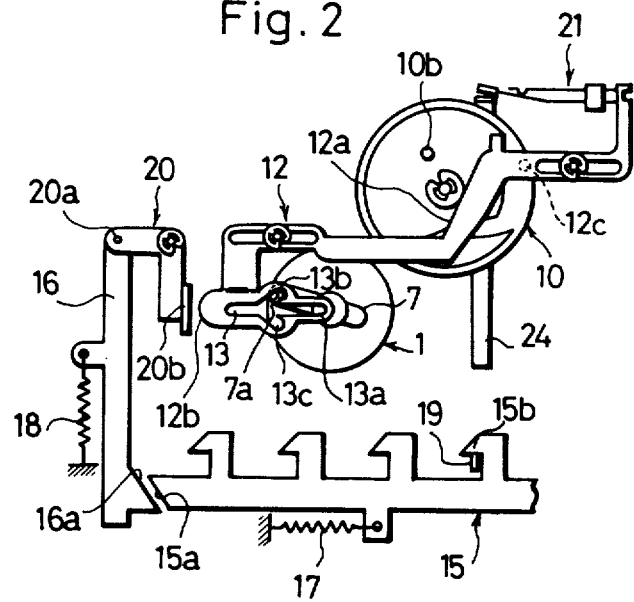
FIG. 2 is a plan view of the automatic stop mechanism of the present invention in the operation mode.
Figure 3:
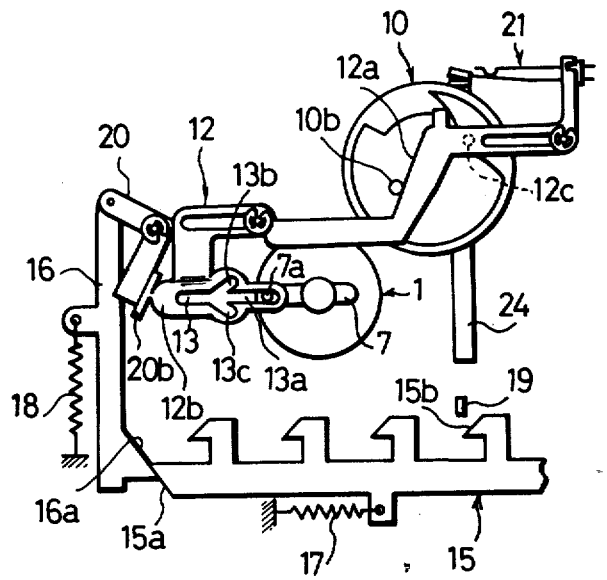
FIG. 3 is a plan view of the automatic stop mechanism of the present invention in the state of its automatic stopping operation.
Figure 4:
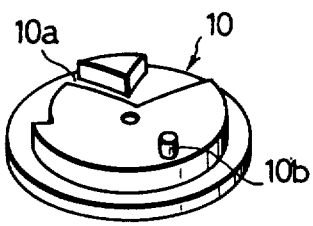
FIG. 4A is a perspective view of a second rotary member incorporated in the automatic stop mechanism of the present invention, as viewed from its upper side.
FIG. 4B is a perspective view of the second rotary body shown in FIG. 4A, as viewed from its lower side.
Figure 4:
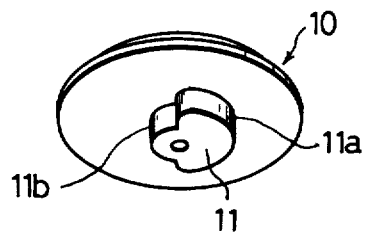

As a result, the oscillation plate 7 is rotated to bring its pin 7a to a position in the retaining slot 13b as shown in FIG. 2, thereby to prevent the slide plate 12 from further moving in the direction opposite the direction of the arrow C, so that the engaging pin 12c of the slide plate 12 cannot engage the cam groove 10a formed in the second rotary member 10. Namely, during the play-back operation, the slide plate 12 makes a reciprocating motion first in the direction of the arrow C and then in the reverse direction, by the mutual engagement of the cam port 13 and the pin 7a and the mutual engagement of the inclined portion 12a and the drive pin 10b.

As the tape is extracted fully from the supply reel, the energization of the oscillation plate 7 in the direction of the arrow A is released since the pulley 8 is now retracted from the first rotary member, although the second rotary member 10 continues to rotate in the direction of the arrow B. In this state, the oscillation plate 7 is relatively free to rotate and the pin 7a of the oscillation; plate 7 will thus no longer limit movement of the slide plate 12. Therefore, as the inclined portion 12a is released from the drive pin 10b of the second rotary member 10, the slide plate 12 is moved fully in the direction opposite to the arrow C by the force of the spring 14. Further, the engaging pin 12c of the slide plate is brought into engagement with the cam groove 10a so that the latter drives the slide plate 12 in the direction opposite to the direction of the arrow C. In consequence, the driving part 12b of the slide plate 12 rotates the rotary lever 20 in the manner shown in FIG. 3, so that the release lever 16 is moved upwardly in the direction of the arrow D to overcome the force of the spring 18. As a result, the tapered cam surface 16a presses the tapered cam surface 15a of the retainer plate 15 to displace the latter in the direction of the arrow C thereby to release the operation rod for the play-back from the retainer plate 15.

The resetting of the operation rod for the play-back causes the operation lever 24 to be reset at the starting position, so that the operation member 22 is released from the pressing force, and the switch 21 is opened to stop the driving motor.

Hereinafter, a description will be made as to the function for preventing erroneous operation, with specific reference to FIGS. 6 and 7. FIG. 6 and FIG. 7A show the automatic stop mechanism of the present invention in inoperative state. In this state, the operation member 22 is not engaged by the operation lever 24, and the engaging pin 23 provided on the operation member 22 is in engagement with the small-diameter portion 11b of the circular cam 11 of the second rotary member 10. Therefore, the operation member 22 does not actuate the switch 21 to keep the latter in off state. As the play-back operation rod is operated in this state, the operation lever 24 is moved in the direction of arrow D, so that the operation lever 24 is moved also in the direction of arrow D, and the operation member 22 is rotated in the direction of arrow E (See FIG. 6).

Therefore, the bent tab 22a of the operation member 22 closes the switch 21 as shown in FIG. 7B, so that the driving motor is started to commence the play-back operation. As a result, the second rotary member 10 and, accordingly, the circular cam 11 is rotated. Then, as the automatic stop mechanism operates in a manner described above, after the tape has been fully extracted from the supply reel, the play-back operation rod is reset to the starting position and the operation lever 24 is also reset to the starting position as shown in FIG. 7C.

In this state, although the operation member 22 is released from the operation lever 24, it cannot be reset to the starting position because the engaging pin 23 of the operation member is now in engagement with the large-diameter portion 11a of the circular cam 11. The driving motor therefore continues to drive the second rotary member 10. The engaging pin 23 becomes disengaged from the large-diameter portion 11a of the circular cam 11 as a result of a further rotation of the second rotary member, and is brought into engagement with the small-diameter portion 11b of the circular cam 11, so that the switch 21 is thus opened to stop the driving motor. As a result, the rotation of the second rotary member 10 is stopped. Therefore, it is avoided that the slide plate 12 is stopped in the position shown in FIG. 3, and the slide plate 12 is stopped only after it is moved back to the position shown in FIG. 1 without fail.

As has been described, according to the present invention, there is provided an automatic stop mechanism for a tape recorder comprising a first rotary member adapted to rotate in connection with the feed of the tape; an oscillation plate 7 provided on the first rotary member 1 and capable of slipping on the latter; a second rotary member 10 adapted to rotate independently of the feed of the tape; a cam groove 10a and a drive pin 10b provided on one side of the second rotary member 10; a circular cam 11 having a large-diameter and small-diameter portions and provided on the other side of the second rotary member 10; a slide plate 12 engaging the oscillation plate 7 and slidable upon engagement with and disengaged from the cam goove 10a and the driving pin 10b; a releasing lever 16 adapted to be moved by the slide plate 12; a retainer plate adapted to hold the operation rods such as those for play-back rewinding and fast forwarding and an operation lever 24 adapted to be moved by the operation rod; an operation member 22 movable upon engagement with the circular cam 11 and the operation lever 24; and a switch engageable with the operation member 22. The switch 21 is adapted to maintain the operation of the driving motor even after the resetting of the operation rod from the operating position to the starting position, until the slide plate 12 is moved back to the starting position by the engagement of the operation member 22 with the large-diameter portion 11a of the circular cam 11. Therefore, the driving motor is not stopped at the instant at which the slide plate 12 moves the retainer plate 15 through the releasing lever 16 to release the operation rod, but is stopped only after the slide plate 12 is reset to the starting position.

Therefore, the automatic stop mechanism can function safely and surely avoiding undesirable erroneous operation.

What is claimed is:

1. An automatic stop mechanism for a tape recorder comprising, in combination:
    (a) an operation member for switching the operation of said tape recorder between an operative mode and an inoperative mode;
    (b) a first rotary member adapted to rotate in connection with the rotation of either one of the supply reel or the take-up reel of said tape recorder;
    (c) a second rotary member adapted to rotate in connection with the rotation of a conventional drive means which is energized in said operative mode of said tape recorder;
    (d) a slide member slidable between a first position and a second position;
    (e) driving means adapted to cause the sliding movement of said slide member between said first and second positions making use of the torque of said second rotary member;
    (f) control means adapted to prevent said slide member from sliding to said second position during rotation of said first rotary member and to allow said slide member to slide to said second position when said first rotary member is not rotating; and
    (g) releasing means adapted to respond to said slide member when the latter is in said second position to actuate said operation member to switch said tape recorder to said inoperative mode.

2. An automatic stop mechanism for a tape recorder as claimed in claim 1 characterized by further comprising:
    a switch for switching said drive means between an operative state and inoperative state;
    switch actuating means adatped to turn said switch on in the operative mode of said tape recorder and to turn said switch off in the inoperative mode of said tape recorder; and
    delay means adapted to maintain said switch in the on state, until said slide member is slid back from said second position to said first position, irrespective of the switching of said tape recorder to said inoperative mode after the stopping of said first rotary member.

3. An automatic stop mechanism for a tape recorder as claimed in claim 1 or 2, wherein said operation member includes push buttons for operating said tape recorder at least for recording, play-back and stopping, and a retainer plate operatively connected to said push buttons and adapted to maintain said tape recorder in said operative state or said inoperative state.

4. An automatic stop mechanism for a tape recorder as claimed in claim 3, wherein said retainer plate is adapted to be driven by said releasing means so as to switch said tape recorder from said operative mode to said inoperative mode.

5. An automatic stop mechanism for a tape recorder as claimed in claim 1 or 2, wherein said driving means include a spring for normally biasing said slide member toward said second position, a driving cam provided on said second rotary member and adapted to cause a movement of said slide member toward said second position and a projection for causing a movement of said slide member toward said first position.

6. An automatic stop mechanism for a tape recorder as claimed in claim 5, wherein said slide member is provided with a cam follower adapted to cooperate with said driving cam.

7. An automatic stop mechanism for a tape recorder as claimed in claim 1 or 2, wherein said control means include a swingable lever adapted to swing upon frictional engagement with said first rotary member, and a first and a second slot formed in said slide member and adapted to receive a part of said swingable lever, said first slot being elongated in the direction of sliding movement of said slide member, while said second slot being formed transversely of said first slot so as to receive said part of said swingable lever to prevent said slide member from moving to said second position during rotation of said first rotary member.

8. An automatic stop mechanism for a tape recorder as claimed in claim 7, wherein said second slot of said slide member extends from each side of said first slot transversely of said first slot.

9. An automatic stop mechanism for a tape recorder as claimed in claim 7, wherein said swingable lever is kept at its one end with a frictional engagement with the rotary shaft of said first rotary member by means of a spring, while the other end being a free end.

10. An automatic stop mechanism for a tape recorder as claimed in claim 9, wherein said free end of said swingable lever has a projection adapted to be received by said first or second slot of said slide member.

11. An automatic stop mechanism for a tape recorder as claimed in claim 2, wherein said switch is a leaf switch having a pair of contacts.

12. An automatic stop mechanism for a tape recorder as claimed in claim 2, wherein said switch driving means include a lever operatively connected to said operation member and adapted to mechanically actuate said switch.

13. An automatic stop mechanism for a tape recorder as claimed in claim 2, wherein said delay means include a switching cam mounted on said second rotary member and an operation member adapted to be displaced upon contact with the cam surface of said switching cam toward and away from said switch to turn said switch on and off.

14. An automatic stop mechanism for a tape recorder as claimed in claim 13, wherein said switching cam is provided on the side of said second rotary member opposite to the side on which said driving cam is provided.

15. An automatic stop mechanism for a tape recorder as claimed in claim 13, wherein said operation member is adapted to hold said switch in on state through the action of said switching cam, until said slide member is reset from said second position to said first position.

* * * * *